United States Patent
Poelma et al.

(10) Patent No.: US 11,135,744 B2
(45) Date of Patent: Oct. 5, 2021

(54) REVERSIBLE THERMOSETS FOR ADDITIVE MANUFACTURING

(71) Applicant: Carbon, Inc., Redwood City, CA (US)

(72) Inventors: Justin Poelma, Sunnyvale, CA (US); Jason P. Rolland, San Carlos, CA (US); Rick Hubertus Nicolas Curvers, San Francisco, CA (US); Joseph M. DeSimone, Monte Sereno, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/274,846

(22) PCT Filed: Aug. 30, 2019

(86) PCT No.: PCT/US2019/049046
§ 371 (c)(1),
(2) Date: Mar. 10, 2021

(87) PCT Pub. No.: WO2020/055609
PCT Pub. Date: Mar. 19, 2020

(65) Prior Publication Data
US 2021/0245401 A1    Aug. 12, 2021

Related U.S. Application Data

(60) Provisional application No. 62/730,686, filed on Sep. 13, 2018.

(51) Int. Cl.
*B33Y 70/00* (2020.01)
*B29B 17/04* (2006.01)
(Continued)

(52) U.S. Cl.
CPC ...... *B29B 17/0408* (2013.01); *B29B 17/0026* (2013.01); *B29B 2017/042* (2013.01);
(Continued)

(58) Field of Classification Search
CPC .......... B29B 17/0408; B29B 2017/042; B33Y 70/00
See application file for complete search history.

(56) References Cited

U.S. PATENT DOCUMENTS 3,213,058 A   10/1965  Boyle et al.
3,694,389 A    9/1972  Levy
(Continued)

FOREIGN PATENT DOCUMENTS

WO    2015164234 A1   10/2015
WO    2016145182 A1    9/2016

OTHER PUBLICATIONS

International Preliminary Report on Patentability corresponding to PCT/US2019/049046; dated Dec. 9, 2020 (25 pages).
(Continued)

*Primary Examiner* — James Sanders
(74) *Attorney, Agent, or Firm* — Myers Bigel, P.A.

(57) ABSTRACT

Provided herein is a method of recycling additively manufactured articles or recovered coating material that comprises a crosslinked polymer formed from a single-cure resin comprising a reactive blocked prepolymer, into a regenerated resin useful for additive manufacturing. Recyclable light-polymerizable resins, methods of making a recyclable objects from such resins, and methods for sustainable manufacturing are also provided.

17 Claims, 3 Drawing Sheets

(51) Int. Cl.
*B29B 17/00* (2006.01)
*B33Y 80/00* (2015.01)
*B29K 105/24* (2006.01)

(52) U.S. Cl.
CPC ... *B29B 2017/0484* (2013.01); *B29K 2105/24* (2013.01); *B33Y 70/00* (2014.12); *B33Y 80/00* (2014.12)

(56) References Cited

U.S. PATENT DOCUMENTS

| | | |
|---|---|---|
| 3,947,426 A | 3/1976 | Lander |
| 5,236,637 A | 8/1993 | Hull |
| 5,391,072 A | 2/1995 | Lawton et al. |
| 5,529,473 A | 6/1996 | Lawton et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,892,474 B2 | 2/2011 | Shkolnik et al. |
| 8,088,245 B2 | 1/2012 | Lutz et al. |
| 8,110,135 B2 | 2/2012 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,796,693 B2 | 10/2017 | Bossaert et al. |
| 2013/0202392 A1 | 8/2013 | Morimoto et al. |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0288376 A1 | 10/2016 | Sun et al. |
| 2017/0129167 A1 | 5/2017 | Castanon |
| 2017/0129169 A1 | 5/2017 | Batchelder et al. |
| 2018/0126630 A1 | 5/2018 | Panzer et al. |
| 2018/0243976 A1 | 8/2018 | Feller |
| 2018/0290374 A1 | 10/2018 | Willis et al. |

OTHER PUBLICATIONS

International Search Report and Written Opinion corresponding to PCT/US2019/049046; dated Nov. 12, 2019 (15 pages).

Davidson, Joshua R., et al., "Design Paradigm Utilizing Reversible Diels—Alder Reactions to Enhance the Mechanical Properties of 3D Printed Materials", ACS Applied Materials & Interfaces 8(26), 2016, 16961-16966.

Janusziewicz, Rima, et al., "Layerless fabrication with continuous liquid interface production", PNAS, 113, 2016, 11703-11708.

Malik, Jitendra, et al., "A thermally reworkable UV curable acrylic adhesive prototype", International Journal of Adhesion & Adhesives, 22(4), 2020, 283-289.

Malik, Jitendra, et al., "Comparative Study of Novel Polymer Prototype for Controlled Thermally Reworkable UV Curable Acrylic Adhesives in Absence and Presence of Reactive Diluent", Surface Engineering, 19(2), 2003, 121-126.

Tumbleston, John R., et al., "Continuous liquid interface production of 3D Objects", Science, 347(6228), 2015, 1349-1352.

Yang, Kejia, et al., "Diels-Alder Reversible Thermoset 3D Printing: Isotropic Thermoset Polymers via Fused Filament Fabrication", Advanced Functional Materials 27(24), 2017, 1-11.

Zhang, Biao, et al., "Reprocessable thermosets for sustainable three-dimensional printing", Nature Communications, 9(1), 2018, 1-7.

REVERSIBLE THERMOSETS FOR ADDITIVE MANUFACTURING

CROSS REFERENCE TO RELATED APPLICATIONS

This application is a 35 U.S.C. § 371 national phase application of International Application Serial No. PCT/US2019/049046, filed Aug. 30, 2019, which claims priority to U.S. Provisional Application Ser. No. 62/730,686, filed Sep. 13, 2018, the entire contents of which are hereby incorporated by reference.

FIELD OF THE INVENTION

The present invention concerns additive manufacturing in general, and particularly concerns resins suitable for producing additively manufactured products that can be recycled, the products of such recycling, and methods of using such products.

BACKGROUND OF THE INVENTION

In conventional additive manufacturing techniques (often referred to as "3D printing"), construction of a three-dimensional object is performed in a step-wise or layer-by-layer manner by sequentially exposing a light-polymerizable resin to patterned light. Generally referred to as "stereolithography," numerous examples are known, including those described in U.S. Pat. No. 5,236,637 to Hull (see, e.g., FIGS. 3-4) and 7,892,474 to Shkolnik. Additional examples are given in U.S. Pat. Nos. 5,391,072 and 5,529,473 to Lawton, U.S. Pat. No. 7,438,846 to John, 8,110,135 to El-Siblani, and U.S. Patent Application Publication Nos. 2013/0292862 to Joyce and 2013/0295212 to Chen et al.

Unfortunately, additive manufacturing techniques have generally been slow, and have long been known to produce parts with a limited range of mechanical properties, frequently rendering such products unsuitable for real world use beyond simple prototyping.

More recently, techniques referred to as "continuous liquid interface production" (or "CLIP") have been developed. These techniques enable the rapid production of three-dimensional objects, preferably in a layerless manner, by which the parts may have desirable structural and mechanical properties. See, e.g., J. DeSimone et al., U.S. Pat. Nos. 9,211,678; 9,205,601; and 9,216,546; J. Tumbleston, et al., *Continuous liquid interface production of 3D Objects*, Science 347, 1349-1352 (2015), and R. Janusziewcz et al., *Layerless fabrication with continuous liquid interface production*, Proc. Natl. Acad. Sci. USA 113, 11703-11708 (2016). The increasing availability of additive manufacturing techniques for the manufacture of real-world articles, beyond prototyping, creates a need for new sustainable chemistry approaches in this field.

SUMMARY OF THE INVENTION

Provided herein is a method of recycling additively manufactured articles (e.g., dental models) or recovered coating material, into a regenerated resin useful for additive manufacturing: comprising: (a) providing a preformed article, or recovered coating material, produced by the process of light polymerizing a single-cure resin in an additive manufacturing (or coating) process, said resin comprising or consisting essentially of: (i) a reactive blocked prepolymer; (ii) optionally—but in some embodiments preferably-polymerized reactive blocking agents; (iii) optionally—but in some embodiments preferably—a reactive blocking agent; (iv) a photoinitiator; (v) optionally a reactive diluent; (vi) optionally a light absorber; (vii) optionally a solvent; (viii) optionally a radical polymerization inhibitor; (ix) optionally pigments and/or dyes; and (x) optionally at least one filler; said preformed article or recovered coating material comprised of at least 70, 80 or 90 percent by weight of a crosslinked polymer, said crosslinked polymer consisting essentially of said reactive blocked prepolymer, said reactive diluent when included, and said polymerized reactive blocking agents when included (or copolymer of the reactive blocking agent and reactive diluent), in light polymerized, cross-linked, thermoset form; then (b) comminuting said preformed articles or recovered coating material into a reactive particulate material (e.g., by grinding such as cryo-milling, shredding, chopping, or pelletizing), and/or melt-pressing said preformed articles or recovered coating material into a new shape.

In some embodiments, the method further comprises: (c) combining said reactive particulate material (e.g., in an amount of from 1, 2 or 4 percent by weight to 20, 25, or 30 percent by weight, or more) with additional reactive blocking agent (and optionally a non-reactive blocking agent), and optionally additional (unpolymerized) reactive diluent or solvent, to form a mixture and heating said mixture (e.g., to a temperature of from 40, 60 or 70° Celsius to 90, 100, or 120° Celsius, or more) for a time sufficient to form a homogeneous solution or suspension comprising a regenerated reactive (and non-reactive, when present) blocked prepolymer, optionally said additional reactive and/or non-reactive blocking agent, optionally said additional solvent, optionally said additional radical polymerization inhibitor, and polymerized reactive blocking agent (or a copolymer of blocking agent and reactive diluent).

In some embodiments, the method further comprises: (d) mixing said homogeneous solution or suspension with additional photoinitiator, optionally but in some embodiments preferably additional light absorber, optionally but in some embodiments preferably additional reactive blocked prepolymer, optionally but in some embodiments preferably additional reactive diluent or solvent, optionally but in some embodiments preferably additional reactive and/or non-reactive blocking agent, and optionally but in some embodiments preferably additional polymerized reactive blocking agents (or copolymer or reactive blocking agents and reactive diluent) to produce a regenerated resin useful for additive manufacturing, wherein said regenerated resin is light-polymerizable.

In some embodiments, the polymerized reactive blocking agent comprises a polyacrylate polymer (a polymer formed from the polymerization of vinyl group-containing monomers), such as: a poly(methacrylate), a poly(acrylate), a poly(styrene), a poly(acrylamide), or a copolymer thereof.

In some embodiments, the reactive blocking agent comprises an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, or a mixture of two or more thereof).

In some embodiments, the reactive blocked prepolymer or regenerated reactive blocked prepolymer comprises a reactive blocked polyurethane prepolymer, a reactive blocked polyurea prepolymer, a reactive blocked polyurethane-polyurea copolymer, or a combination thereof.

In some embodiments, the reactive blocked prepolymer or regenerated reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers. In some embodiments, the reactive blocked prepolymer comprises a (meth)acrylate-blocked prepolymer.

In some embodiments, the reactive diluent comprises an acrylate, a methacrylate, a styrene, an acrylic acid, a vinylamide, a vinyl ether, a vinyl ester, polymers containing any one or more of the foregoing, or a combination of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate, and mixtures thereof). In some embodiments, the reactive diluent comprises a monofunctional reactive diluent (e.g., isobornyl methacrylate).

In some embodiments, the resin comprises a chain transfer agent (e.g., butyl 3-mercaptopropionate, dodecane thiol, 2,2'-(ethylenedioxy)diethanethiol, nonyl thiol, 4-methylthiophenol, isooctylmercapto propionate, or a mixture of two or more thereof).

Also provided is a light-polymerizable resin produced by a process taught herein.

Further provided is a recyclable light-polymerizable resin useful for additive manufacturing, comprising or consisting essentially of: (i) a reactive blocked prepolymer (e.g., a reactive blocked polyurethane prepolymer, a reactive blocked polyurea prepolymer, a reactive blocked polyurethane-polyurea copolymer, or a combination thereof), and optionally a non-reactive blocked prepolymer; (ii) polymerized reactive blocking agents (e.g., from 1, 2 or 5 percent by weight, to 20, 25 or 30 percent by weight or more), and optionally polymerized reactive diluent copolymerized therewith; (iii) optionally, but in some embodiments preferably, a reactive blocking agent and/or a non-reactive blocking agent (e.g., from 1, 2 or 5 percent by weight, to 20, 25 or 30 percent by weight or more; (iv) a photoinitiator; (v) optionally a reactive diluent; (vi) optionally a light absorber; (vii) optionally a solvent; (viii) optionally pigments and/or dyes; (ix) optionally a radical polymerization inhibitor; and (x) optionally at least one filler.

In some embodiments, the polymerized reactive blocking agent comprises a polyacrylate polymer (a polymer formed from the polymerization of vinyl group-containing monomers), such as: a poly(methacrylate), a poly(acrylate), a poly(styrene), a poly(acrylamide), or a copolymer of two or more thereof.

In some embodiments, the reactive blocking agent comprises an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, or a mixture of two or more thereof).

In some embodiments, the reactive blocked prepolymer comprises a reactive blocked polyurethane prepolymer, a reactive blocked polyurea prepolymer, a reactive blocked polyurethane-polyurea copolymer, or a combination thereof.

In some embodiments, the reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers. In some embodiments, the reactive blocked prepolymer comprises a (meth)acrylate-blocked prepolymer.

In some embodiments, the reactive diluent comprises an acrylate, a methacrylate, a styrene, an acrylic acid, a vinylamide, a vinyl ether, a vinyl ester, polymers containing any one or more of the foregoing, and combinations of two or more of the foregoing (e.g., acrylonitrile, styrene, divinyl benzene, vinyl toluene, methyl acrylate, ethyl acrylate, butyl acrylate, methyl (meth)acrylate, an amine (meth)acrylate, and mixtures thereof). In some embodiments, the reactive diluent comprises a monofunctional reactive diluent (e.g., isobornyl methacrylate).

In some embodiments, the resin further comprises a chain transfer agent (e.g., butyl 3-mercaptopropionate, dodecane thiol, 2,2'-(ethylenedioxy)diethanethiol, nonyl thiol, 4-methylthiophenol, isooctylmercapto propionate, or a mixture of two or more thereof).

Also provided is a method of making a recyclable object by additive manufacturing, comprising: (a) providing a resin as taught herein; and (b) producing said object (e.g., a dental model) by light polymerizing said resin in an additive manufacturing process (e.g., bottom-up or top-down stereolithography).

In some embodiments, the method may further include: (c) comminuting said object (e.g., by grinding such as cryo-milling, shredding, chopping, or pelletizing) to form a reactive particulate material useful for the production of a light-polymerizable additive manufacturing resin.

Still further provided is a sustainable manufacturing method, comprising the steps of: (a) shipping a recyclable light-polymerizable resin (e.g., a resin as taught here) to at least one user; (b) collecting objects produced from said resin (e.g., by additive manufacturing, such as by bottom-up or top-down stereolithography) back from said at least one user; and/or (c) converting said objects back to a subsequent recyclable light-polymerizable resin (e.g., by a method as taught herein).

In some embodiments, the method may further include: (d) shipping a subsequent recyclable light-polymerizable resin to at least one user.

In some embodiments, the objects comprise dental models.

In some embodiments, the at least one user comprises a plurality of users.

The foregoing and other objects and aspects of the present invention are explained in greater detail in the specification set forth below. The disclosures of all United States patent references cited herein are to be incorporated herein by reference.

BRIEF DESCRIPTION OF THE DRAWINGS

In FIG. 2B, PICT is included in the initial polymerization of the resin, and added to rebalance resin components after communiting the formed article and heating to form a homogeneous solution or suspension, to form a regenerated resin.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art. The disclosures of US patents and patent publications cited herein are to be incorporated by reference to the extent consistent with the present disclosure.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof. The sequence of operations (or steps) is not limited to the order presented in the claims or figures unless specifically indicated otherwise.

As used herein, the term "and/or" includes any and all possible combinations of one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

The transitional phrase "consisting essentially of" means that the scope of a claim is to be interpreted to encompass the specified materials or steps recited, and also additional materials or steps that do not materially affect the basic and novel characteristics of the claimed invention as described herein.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. Furthermore, a first, second, third, etc. component or material may be the same as or different from one another.

It will also be understood that an "additional" component or material may be the same as or different from the component or material previously used. For example, additional reactive diluent may be the same reactive diluent as used in a prior step, or it may be a different reactive diluent that is added, without departing from the teachings of the present invention. If the prior component or material was optional, the "additional" component or material may be the first or only instance of that component or material.

"ABPU" or "reactive blocked polyurethane" as used herein refers to UV-curable, (meth)acrylate blocked, polyurethane/polyurea such as described in U.S. Pat. Nos. 9,453,142 and 9,598,606 to Rolland et al. A particular example of a suitable reactive (or UV-curable) blocking agent for the ABPU is a tertiary amine-containing (meth)acrylate (e.g., t-butylaminoethyl methacrylate, TBAEMA, tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof).

In some embodiments, non-reactive blocked polyurethane may be further provided in the composition, inclusive of an ABPU that has at least one end that is blocked by a non-reactive group (while another end is reactive). Such non-reactive blocking groups may include, for example, volatile blocking groups such as 3,5-dimethylpyrazole (DMP), 2-butanone oxime (also called methyl ethyl ketoxime or "MEKO"), etc. See, e.g., WO 2018/226943 to Chen et al.

In some embodiments, an excess of the blocking agent (reactive or non-reactive) may be removed from the composition by distillation or chromatography, if desired.

Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) ($H_{12}$MDI), hexamethylene diisocyanate (HDI), isophorone diisocyanate (IPDI), polymeric MDI, 1,4-phenylene diisocyanate (PPDI), and o-tolidine diisocyanate (TODI). In some embodiments, a preferred diisocyanate is $H_{12}$MDI, such as Desmodur W, supplied by Covestro AG. Additional examples include but are not limited to those given in U.S. Pat. No. 3,694,389 to Levy.

Reactive blocking agents useful in the present invention include amine (meth)acrylate monomer blocking agents (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, and mixtures thereof. See, e.g., US Patent Application Publication No. 20130202392. There are, however, many blocking agents for isocyanate, and those skilled in the art can couple (meth)acrylate groups to other blocking agents to create additional blocking agents that can be used to carry out the present invention. Still further, those skilled in the art can use maleimide, or substitute maleimide on other known blocking agents, for use in the present invention.

Examples of known blocking agents which can be substituted on or covalently coupled to (meth)acrylate or maleimide for use in the present invention include, but are not limited to, phenol type blocking agents (e.g., phenol, cresol, xylenol, nitrophenol, chlorophenol, ethyl phenol, t-butylphenol, hydroxy benzoic acid, hydroxy benzoic acid esters, 2,5-di-t-butyl-4-hydroxy toluene, etc.), lactam type blocking agents (e.g., s-caprolactam, δ-valerolactam, γ-butyrolactam, β-propiolactam, etc.), active methylene type blocking agents (e.g., diethyl malonate, dimethyl malonate, ethyl acetoacetate, methyl acetoacetate, acetyl acetone, etc.), alcohol type blocking agents (e.g., methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxyethanol, glycolic acid, glycolic acid esters, lactic acid, lactic acid ester, methylol urea, methylol melamine, diacetone alcohol, ethylene chlorohydrine, ethylene bromhydrine, 1,3-dichloro-2-propanol, n-hydroperfluoro alcohol, acetocyanhydrine, etc.), mercaptan type blocking agents (e.g., butyl mercaptan, hexyl mercaptan, t-butyl mercaptan, t-dodecyl mercaptan, 2-mercaptobenzothiazole, thiophenol, methyl thiophenol, ethyl thiophenyl, etc.), acid amide type blocking agents (e.g., acetoanilide, acetoanisidine amide, acrylamide, methacrylamide, acetic amide, stearic amide, benzamide, etc.), imide type blocking agents (e.g., succinimide, phthalimide, maleimide, etc.), amine type blocking agents (e.g., diphenylamine, phenylnaphthylamine, xylidine, N-phenyl xylidine, carbazole, aniline, naphthylamine, butylamine, dibutylamine, butyl phenylamine, etc.), imidazole type blocking agents (e.g., imidazole, 2-ethylimidazole, etc.), urea type blocking agents (e.g., urea, thiourea, ethylene urea, ethylene thiourea, 1,3-diphenyl urea, etc.), carbamate type blocking agents (e.g., N-phenyl carbamic acid phenyl ester, 2-oxazolidone, etc.), imine type blocking agents (e.g., ethylene imine, etc.), oxime type blocking agents (e.g., formaldoxime, acetaldoximine, acetoxime, methylethyl ketoxime, diacetylomonoxime, benzophenoxime, cyclohexanonoxime, etc.) and sulfurous acid salt type blocking agents (e.g., sodium bisulfite, potassium bisulfite, etc.). Of these, use is preferably made of the phenol type, the lactam type, the active methylene type and the oxime type blocking agents. See, e.g., U.S. Pat. No. 3,947,426 to Lander.

Photoinitiators useful in the present invention include, but are not limited to, diphenyl(2,4,6-trimethylbenzoyl)phosphine oxide (TPO), Phenylbis(2,4,6-trimethylbenzoyl)phosphine oxide (PPO), 2-isopropylthioxanthone and/or 4-isopropylthioxanthone (ITX), etc.

"Diluents" as used herein includes both UV-curable diluents (for example monoacrylates, mono-methacrylates, polyacrylates, polymethacrylates, acrylamides, methacrylamides, etc.), and non-UV-curable diluents (for example, plasticizers such as bis(2-ethylhexyl) phthalate, bis(2-propylheptyl) phthalate, diisononyl phthalate, tri-(2-ethylhexyl) trimellitate, bis(2-ethylhexyl) adipate, diisononyl adipate, dibutyl sebacate, diisobutyl maleate, etc.).

"Solvents" as used herein includes, for example, diethyl ether, tetrahydrofuran, ethyl acetate, benzene, toluene, N,N-dimethylformamide, propylene carbonate, dimethyl carbonate, etc.

"Chain transfer agents" useful in the present invention include, but are not limited to, butyl 3-mercaptopropionate, dodecane thiol, 2,2'-(ethylenedioxy)diethanethiol, nonyl thiol, 4-methylthiophenol, isooctylmercapto propionate, or a mixture of two or more thereof. In some embodiments, inclusion of a chain transfer agent in the resin lowers the average molecular weight of the resulting polymers, which may aid in recycling/rebalancing.

A "radical polymerization inhibitor" includes, but is not limited to, 4-methoxyphenol (also known as monomethyl ether hydroquinone (MEHQ), or mequinol), 4-ethoxyphenol, 4-propoxyphenol, 4-butoxyphenol 4-heptoxyphenol, 2,6-di-tert-butyl-4-methylphenol (see, e.g., U.S. Pat. No. 9,796,693), etc., including combinations thereof.

"Shipping" and "collecting" as used herein may be performed by any method of transferring, delivering, or providing, whether directly or through an intermediary. "User" refers to a location, such as a manufacturing or production facility at which objects are produced from the resin, remote or separate from the location from which the resin is shipped, or to which an object may be sent for collection, which location may be operated by the same corporate entity, or by a different corporate entity, from the location from which the resin is shipped. Likewise a "plurality of users" may be different sites or locations operated by the same corporate entity, or operated by different corporate entities.

1. Single-Cure Additive Manufacturing Resins Containing ABPUs.

Dual cure additive manufacturing resins containing ABPUs are described in, for example, U.S. Pat. Nos. 9,453,142 and 9,598,606 to Rolland et al., which are incorporated by reference herein. In the present invention, the resin can consist essentially of the same ingredients as found in such a dual cure resin, but with at least one constituent required for the second or subsequent cure (e.g., the chain extender(s)) omitted or substantially omitted.

A. Light-polymerizable monomers and/or prepolymers. Sometimes also referred to as "Part A" of a dual cure resin, these are monomers and/or prepolymers that can be polymerized by exposure to actinic radiation or light. This resin can comprise difunctional or polyfunctional monomers, but can also include monofunctional monomers (to act as "chain stoppers" to control molecular weight). In contrast to a dual cure resin, where the amount of this "Part A" corresponds to 50 to 90% by weight of the total resin (polymerizable liquid) composition, in the present invention these light-polymerizable components correspond to more than 90 or 95 percent by weight of the total resin composition.

Examples of reactive end groups suitable for Part A constituents, monomers, or prepolymers include, but are not limited to: acrylates, methacrylates, α-olefins, N-vinyls, acrylamides, methacrylamides, styrenics, epoxides, thiols, 1,3-dienes, vinyl halides, acrylonitriles, vinyl esters, maleimides, and vinyl ethers.

Note that, in the present invention, the light polymerizable component, once polymerized, is one which can degrade upon heating or baking. Thus, during heating it is converted, in part, to a component that could be used as a "Part B" thermally reactive component in a dual cure resin. In a typical "dual cure" additive manufacturing resin, the additional part B thermally reactive components (e.g., chain extenders) are carried in the green, light cured, object, where they participate in a subsequent cure to impart desired physical properties to the object. In the present invention, these components are left out, and the Part A component is regenerated by heating the formed blocked polymer in the presence of additional blocking agents (although an additional Part B component may be added at a subsequent stage (e.g., during recycling, or during a subsequent production step), if desired).

B. Additional resin ingredients. Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides such as diphenyl(2,4,6-trimethylbenzoyl)phosphine oxide, phenylbis(2,4,6-trimethylbenzoyl) phosphine oxide (PPO), Irgacure® 369, etc. See, e.g., U.S. Pat. No. 9,453,142 to Rolland et al.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including, for example, pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, polymerizable liquids for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers; siloxanes; acrylonitrile-butadiene rubbers; reactive and non-reactive thermoplastics (including but not limited to: poly(ether imides), maleimide-styrene terpolymers, polyarylates, polysulfones and polyethersulfones, etc.); inorganic fillers such as silicates (such as talc, clays, silica, mica), glass, carbon nanotubes, graphene, cellulose nanocrystals, etc.; including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, isobornyl methacrylate, TBAEMA (tert-butyl amino ethyl methacrylate), tetrahydrofurfuryl methacrylate, N,N-dimethylacrylamide, N-vinyl-2-pyrrolidone, and N-vinyl formamide, or a mixture of two or more thereof. The diluent may be included in the polymerizable liquid in any suitable amount, typically from 1, 5 or 10 percent by weight, up to about 30 or 40 percent by weight, or more.

2. Additive Manufacturing.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, PCT Application Nos. PCT/US2014/015486 (U.S. Pat. No. 9,211,678); PCT/US2014/015506 (U.S. Pat. No. 9,205,601), PCT/US2014/015497 (U.S. Pat. No. 9,216,546), and in J. Tumbleston, D. Shirvanyants, N. Ermoshkin et al., Continuous liquid interface production of 3D Objects, *Science* 347, 1349-1352 (2015). See also R. Januszewcz et al., Layerless fabrication with continuous liquid interface production, *Proc. Nat. Acad. Sci. USA* 113, 11703-11708 (2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially-cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and obviate the need for a semipermeable "window" or window structure include utilizing a liquid interface comprising an immiscible liquid (see L. Robeson et al., WO 2015/164234), generating oxygen as an inhibitor by electrolysis (see L. Craven et al., WO 2016/133759), and incorporating magnetically positionable particles to which the photoactivator is coupled into the polymerizable liquid (see J. Rolland, WO 2016/145182).

Other examples of methods and apparatus for carrying out particular embodiments of CLIP include, but are not limited to, those described in B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169; Sun and Lichkus, Three-dimensional fabricating system for rapidly producing objects, US Patent Application Pub. No. US 2016/0288376; Willis et al., 3d print adhesion reduction during cure process, US Patent Application Pub. No. US 2015/0360419; Lin et al., Intelligent 3d printing through optimization of 3d print parameters, US Patent Application Pub. No. US 2015/0331402; and D. Castanon, Stereolithography System, US Patent Application Pub. No. US 2017/0129167.

3. Recycling of Additively Manufactured Objects.

Figure 1:
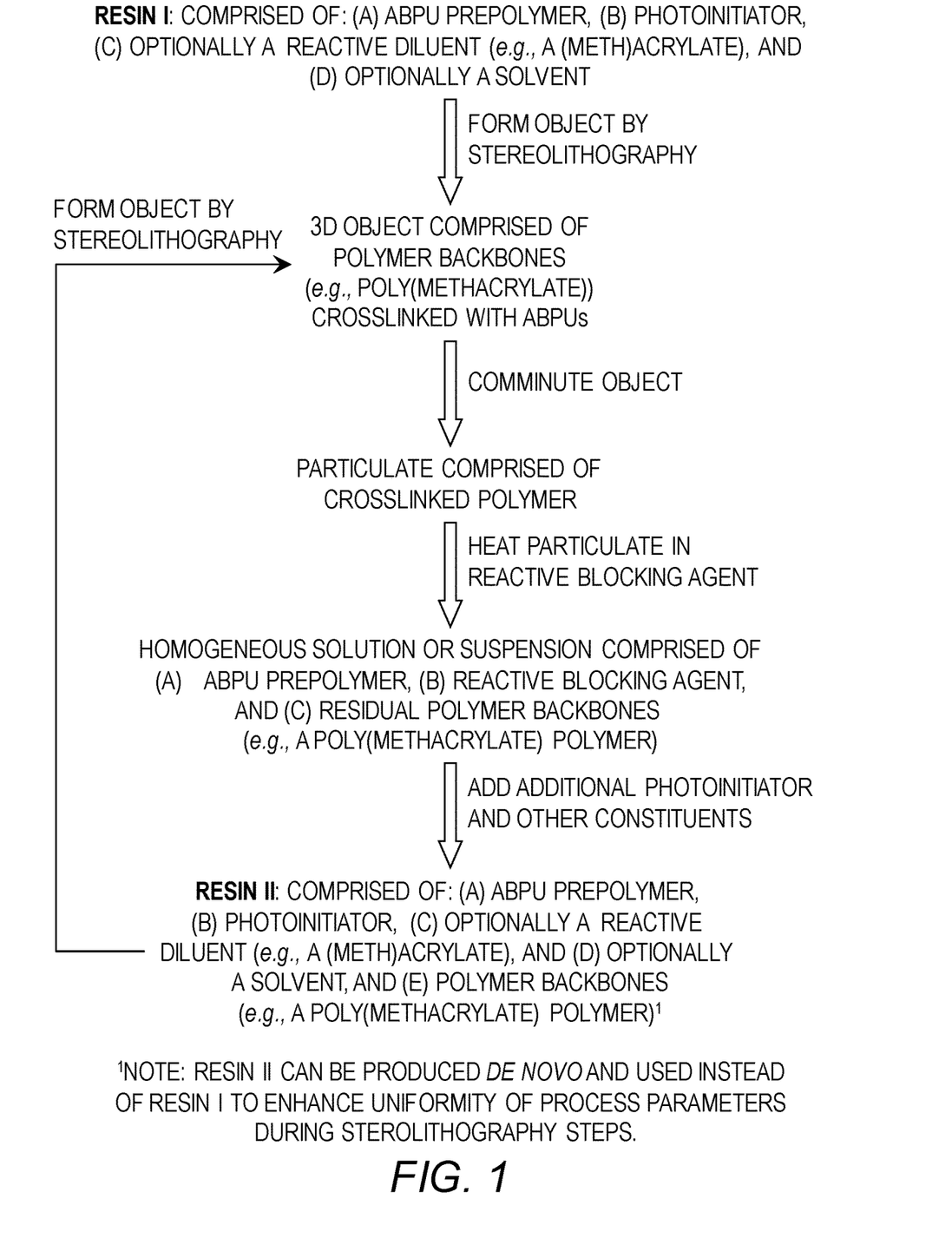
FIG. 1 presents an example scheme in which a three-dimensional object or article may be formed from a first resin, Resin I, (which may be a single-cure resin) by additive manufacturing such as stereolithography. The 3D object may include polymer backbones (e.g., poly(methacrylate)) crosslinked with ABPUs. Alternatively, the material to be recycled may be recovered coating material formed from a first resin, produced by a light-cured coating process.

Non-limiting examples of compositions and methods of the present invention are given in FIG. 1. As shown in the scheme presented in FIG. 1, a three-dimensional object or article may be formed by additive manufacturing such as stereolithography from a first resin, Resin I (which may also be referred to as Gen-1, and which may be a single-cure resin). The 3D object may include polymer backbones (e.g., poly(methacrylate)) crosslinked with ABPUs. Alternatively, the material to be recycled may be recovered coating material formed from a first resin and produced by a light-cured coating process. The resin used to form the preformed article or coating may comprise or consist essentially of: (i) a reactive blocked prepolymer (e.g., ABPU); (ii) optionally—but in some embodiments preferably-polymerized reactive blocking agents; (iii) optionally—but in some embodiments preferably—a reactive blocking agent; (iv) a photoinitiator; (v) optionally a reactive diluent; (vi) optionally a light absorber; (vii) optionally a solvent; (viii) optionally pigments and/or dyes; and (ix) optionally at least one filler; said preformed article (or coating) comprised of at least 70, 80 or 90 percent by weight of a crosslinked polymer, said crosslinked polymer consisting essentially of said reactive blocked prepolymer, said reactive diluent when included, and said polymerized reactive blocking agents when included, in light polymerized, cross-linked, thermoset form.

The article (or recovered coating) may then be: (b) comminuted into a reactive particulate material (e.g., by cryo-milling); and (c) combined (e.g., in an amount of from 1, 2 or 4 percent by weight to 20, 25, or 30 percent by weight, or more) with a reactive blocking agent to form a mixture and heating said mixture (e.g., to a temperature of from 40, 60 or 70 Celsius to 90, 100, or 120 Celsius, or more) for a time sufficient to form a homogeneous solution or suspension comprising said reactive blocked prepolymer, optionally said reactive blocking agent, and polymerized reactive blocking agents; and then (d) mixed with additional photoinitiator, optionally but in some embodiments preferably additional light absorber, optionally but in some embodiments preferably additional reactive blocked prepolymer and optionally but in some embodiments preferably additional reactive diluent, which may then be used to produce a regenerated light-polymerizable resin, Resin II (which may also be referred to as Gen-2), useful for additive manufacturing such as stereolithography. Thereafter, articles formed from Resin II may further be recycled in accordance with these methods, as shown. Alternatively, as noted above, the process may begin with Resin II including the polymer backbones in the mixture to enhance uniformity of process parameters in the additive manufacturing steps.

To provide a sustainable manufacturing method, the recyclable light-polymerizable resin as taught herein may be: (a) shipped to at least one user; (b) objects produced from said resin collected back from said at least one user; and (c) objects converted back to a subsequent recyclable light-polymerizable resin. The subsequent recyclable light-polymerizable resin may then further be shipped to at least one user (same or different users).

In some embodiments, the objects comprise dental models.

In some embodiments, the at least one user comprises a plurality of users (same or different users).

The present invention is explained in greater detail in the following non-limiting Examples.

Example 1

Resin for Production of a Recyclable Dental Model

In the following, the reactive blocked polyurethane prepolymer (ABPU) is the reaction product of a diisocyanate (e.g., isophorone diisocyanate) and a polyol (e.g., PTMO) in a 1-to-1 molar ratio of hydroxyl groups relative to blocked NCO groups (although a ratio greater than 1:1 may in some embodiments be preferred, to improve processability and tune the molecular weight of the chain extended polymer). The remaining isocyanate groups then are capped with tert-butylaminoethyl methacrylate (TBAEMA) forming a blocked isocyanate prepolymer with methacrylic chain ends. A molar excess of diisocyanate is used during ABPU synthesis leading to the formation of TBAEMA-blocked diisocyanates which can serve as rigid crosslinkers during the photopolymerization.

TABLE 1

RESIN INGREDIENTS

| Component | Description | wt % | Typical range wt % |
|---|---|---|---|
| Isobornyl methacrylate | Monofunctional methacrylate monomer | 26.5 | 15-45 |
| ABPU | TBAEMA-blocked isocyanate prepolymer | 72 | 55-85 |
| Pigments | Pigment | 0.5 | 0-1 |
| Diphenyl(2,4,6-trimethylbenzoyl) phosphine oxide | Photoinitiator | 1 | 0.1-5 |

Upon recycling of additively manufactured products produced by such resins, different materials properties can be obtained, as discussed further below.

Example 2

Resin for Production of a Recyclable Dental Model

This example is similar to Example 1 above, except an additional monofunctional monomer is included.

TABLE 2

RESIN INGREDIENTS

| Component | Description | wt % |
|---|---|---|
| Isobornyl methacrylate | Monofunctional methacrylate monomer | 11.5 |
| Tetrahydrofurfuryl methacrylate | Monofunctional methacrylate monomer | 12 |
| ABPU | TBAEMA-blocked isocyanate prepolymer | 75 |
| Pigments | Pigment | 0.5 |
| Diphenyl(2,4,6-trimethylbenzoyl) phosphine oxide | Photoinitiator | 1 |

Example 3

Resin for Production of a Recyclable Dental Model

This example is similar to Example 1 above, except the ABPU contains extra hard segment.

TABLE 3

RESIN INGREDIENTS

| Component | Description | wt % |
|---|---|---|
| Isobornyl methacrylate | Monofunctional methacrylate monomer | 33.5 |
| ABPU with extra hard segment | TBAEMA-blocked isocyanate prepolymer | 65 |
| Pigments | Pigment | 0.5 |
| Diphenyl(2,4,6-trimethylbenzoyl) phosphine oxide | Photoinitiator | 1 |

Example 4

Production of Initial Objects

The formulations of Examples 1-3 are used to prepare a crosslinked three-dimensional object by light polymerization in any suitable additive manufacturing technique, such as by bottom-up stereolithography (for example, by continuous liquid interface production). In such processes, the ABPU copolymerizes with a monofunctional reactive diluent (e.g., isobornyl methacrylate) in the presence of the photoinitiator to form a robust material in objects such as dental models.

Examples 5-8

Synthesis of ABPU-10 and Formulations of Gen-1 Resins

| List of abbreviations | |
|---|---|
| Acrylate blocked polyurethane | ABPU |
| Poly(tetramethylene oxide) | PTMO |
| 2,2'-Methylenebis(cyclohexyl isocyanate) | HMDI |
| 4-Methoxyphenol | MEHQ |
| 2-(tert-Butylamino) ethyl methacrylate | TBAEMA |
| Isobornyl methacrylate | IBOMA |
| 3,3,5-trimethylcyclohexyl methacrylate | CD421A |
| Butyl 3-mercaptopropionate | BuMP |
| Diphenyl(2,4,6-trimethylbenzoyl) phosphine oxide | TPO |
| 2-(3-tert-Butyl-2-hydroxy-5-methylphenyl)-5-chlorobenzotriazole | BLS-1326 |

Example 5

Synthesis of ABPU-10

Prior to the synthesis of ABPU-10, all reactor equipment and glassware were thoroughly cleaned with acetone. The addition funnel was heated to 80° C. and the PTMO flask was heated to 60° C. Then, the melted PTMO was added to the addition funnel (840 g, 1.29 mol). This was followed by the addition of HMDI to the reactor (677 g, 2.58 mol). After stirring HMDI at 70° C. and 100 rpm, a zirconium chelate complex catalyst (K-KAT 6212, available from King Industries Inc., 1 Science Rd. Norwalk, Conn. 06852) was added to the reactor (0.94 g). This was followed by the slow addition of PTMO to the contents of the reactor, which was carried out over the course of 140 min. After 90 min of stirring, the mixture became more viscous and hazier. Therefore, the stirring speed was increased to 150 rpm. After another 90 min of reaction time, the stirring speed was decreased to 90 rpm and the temperature to 50° C. Then, MEHQ (0.498 g) was added to the viscous mixture and TBAEMA (505 g, 2.73 mol) was poured into the addition funnel. Any remaining PTMO was dissolved in TBAEMA by gently shaking the addition funnel. The conversion of the reaction was monitored by IR. After observing no difference in peak intensity for 60 min of reaction time, TBAEMA was dripped into the reactor at 50° C. and 140 rpm. After reacting for 13 hours, the stirring speed was decreased to 80 rpm and the conversion was checked by IR once more, which indicated the absence of isocyanates. To ensure that everything was well-mixed inside the reactor, the stir blade was raised and lowered. Then, the contents of the reactor were transferred to a black container (1847 g, 1.20 mol, 93%).

Example 6

Gen-1 Resin

The following table shows the amounts in gram and weight percentage of all the components of the Gen-1 resin.

| Components | Amounts (g) | Amounts (wt %) |
|---|---|---|
| ABPU-10 | 74.0 | 49.4 |
| IBOMA | 74.0 | 49.4 |
| TPO | 1.5 | 1.0 |
| BLS-1326 | 0.21 | 0.14 |

After the addition of all chemicals, the mixture was placed in a THINKY™ mixer for 50 min at 2000 rpm, which resulted in a clear, homogenous resin. BLS-1326 benzotriazole UV light absorber was obtained from Mayzo Inc., 3935 Lakefield Court, Suwanee, Ga. USA 30024. DC=11.94, $\alpha$=0.0026 $\mu m^{-1}$, $\eta$=2185 cP Example 7

Gen-1 Resin with Copolymer of Reactive Blocking Agent and Reactive Diluent

The following table shows the amounts in gram and weight percentage of all the components of a Gen-1 resin that includes a copolymer of a reactive blocking agent (TBAEMA) and reactive diluent (CD421A).

| Components | Amounts (g) | Amounts (wt %) |
|---|---|---|
| ABPU-10 | 26.2 | 26.2 |
| TBAEMA | 6.1 | 6.1 |
| CD421A | 32.2 | 32.2 |
| TPO | 1.0 | 1.0 |
| Copolymer* | 34.4 | 34.4 |
| BLS-1326 | 0.14 | 0.14 |

*Copolymer mixture contains roughly 50 wt% diluent (CD421A)

After the addition of all chemicals, the mixture was placed in a THINKY™ mixer for 15 min at 2000 rpm, which resulted in a clear, homogenous resin. BLS-1326 benzotriazole UV light absorber was obtained from Mayzo Inc., 3935 Lakefield Court, Suwanee, Ga. USA 30024. DC=14.48, $\alpha$=0.0026 $\mu m^{-1}$, $\eta$=3030 cP Example 8

Gen-1 Resin with Copolymer of Reactive Blocking Agent and Reactive Diluent and Chain Transfer Agent The following table shows the amounts in gram and weight percentage of all the components of a Gen-1 resin that includes a copolymer of a reactive blocking agent (TBAEMA) and reactive diluent (CD421A) as well as a chain transfer agent (BuMP).

| Components | Amounts (g) | Amounts (wt %) |
|---|---|---|
| ABPU-10 | 26.0 | 26.0 |
| TBAEMA | 6.0 | 6.0 |
| CD421A | 31.9 | 31.9 |
| TPO | 1.0 | 1.0 |
| Copolymer* | 34.0 | 34.0 |
| BuMP | 1.1 | 1.1 |
| BLS-1326 | 0.14 | 0.14 |

*Copolymer mixture contains roughly 50 wt % diluent (CD421A)

After the addition of all chemicals, the mixture was placed in a THINKY™ mixer for 15 min at 2000 rpm, which resulted in a clear, homogenous resin. BLS-1326 benzotriazole UV light absorber was obtained from Mayzo Inc., 3935 Lakefield Court, Suwanee, Ga. USA 30024. DC=14.39, $\alpha$=0.0029 $\mu m^{-1}$, $\eta$=2420 cP Example 9

Additive Manufacturing with Gen-1 Resins

Prior to printing, the Gen-1 resin of Example 6 was subjected to DC-$\alpha$ and viscometry measurements. After all necessary print parameters were established, parts were produced using the CLIP process on a Carbon Inc. M1 additive manufacturing apparatus. After production, all parts were washed in isopropyl alcohol for 5 min. The parts were dried in air for 20 min, followed by flood curing for 1 min on both sides in a nitrogen atmosphere.

The mechanical properties of the Gen-1 resin were analyzed and the results of the green properties as well as flood cured parts can be seen in the following table.

|  | Modulus (MPa) | UTS (MPa) | E@B (%) |
|---|---|---|---|
| Green | 796 (±29) | 17.3 (±1.5) | 113 (±14) |
| Flood cured | 868 (±32) | 21.5 (±3.0) | 119 (±9) |

Gen-1 resins of Example 7 and Example 8 were also printed into parts using the CLIP process on a Carbon Inc. M1 additive manufacturing apparatus. After production, parts were washed in isopropyl alcohol for 5 min. The parts were dried in air for 20 min, followed by flood curing for 1 min on both sides in a nitrogen atmosphere.

Example 10

Converting 3D Printed Part into a Powder by Freezer Milling 3D printed parts of Example 9 were converted into a powder by a SPEX CertiPrep 6850 Freezer Mill. This mill was operated by choosing certain parameters, thereby creating a program in-house. Parts that were not flood cured were cut into tiny pieces. These pieces were placed inside the freezer mill vial together with the metal impactor. After putting the vial inside the vial holder, a particular program was chosen (BM6, shown below). During operation, it was ensured that the chamber was filled with sufficient liquid nitrogen. After grinding, the vial was allowed to warm up to room temperature inside a home-made desiccator to avoid moisture contamination. After thoroughly drying for at least 24 hours, the powder was collected inside a glass jar that was sealed with parafilm.

|  | Precooling time (min) | Run time (min) | Recooling time (min) | Cycles | Rate (Hz) |
|---|---|---|---|---|---|
| BM6 | 10 | 1 | 2 | 3 | 15 |

Example 11

Digestion of Powder in Diluents to Regain Raw Materials (Regeneration of ABPU)

Into a 20 mL vial, IBOMA, TBAEMA, and MEHQ were added. This mixture was stirred for at least 1 hour at 50° C., which resulted in a clear homogenous solution. To this solution, Gen-1 powder of Example 10 produced from the resin of Example 6 was added, which resulted in a series of different weight percentages of powder ranging from 17 to 33 (see Table). After the addition of the powder, all solutions were heated to 80° C. for 4 hours. The solutions became clear and homogenous for weight percentages below 25%. Once 25% or above was reached an increase in viscosity resulted in great difficulties in mixing the components (data not shown), at these times and temperatures.

| Weight percentage (%) | Gen-1 powder mass (g) | TBAEMA (g) | IBOMA (g) | MEHQ (mg) |
|---|---|---|---|---|
| 17 | 1.00 | 0.625 | 4.19 | 15 |
| 19 | 1.00 | 0.563 | 3.63 | 15 |
| 22 | 1.00 | 0.500 | 3.06 | 15 |
| 25 | 1.00 | 0.25 | 2.69 | 15 |
| 27 | 1.00 | 0.242 | 2.5 | 15 |
| 33 | 1.00 | 0.125 | 1.88 | 15 |

Example 12

Digestion of Powder in Diluents to Regain Raw Materials for Gen-1 Resin with Copolymer of Reactive Blocking Agent and Reactive Diluent Into a 20 mL vial, CD421A, TBAEMA, and MEHQ were added. This mixture was vortex mixed for at least 60 s, which resulted in a clear homogenous solution. To this solution, Gen-1 powder from Example 10 produced from the resin of Example 7 was added in which two different powder loadings were chosen (see Table). After this addition step, all powders were soaked in the solution overnight. The swollen powders were heated and stirred at 120° C. for a time range of 30 min-4 hours. After this heating step, the solutions were cooled down while stirring for 30 min. The color and viscosity of the digest varied with the digestion time.

| Weight percentage (%) | Gen-1 powder mass (g) | TBAEMA (g) | CD421A (g) | MEHQ (mg) |
|---|---|---|---|---|
| 24 | 3.00 | 1.52 | 8.05 | 5 |
| 28 | 3.00 | 1.15 | 6.48 | 4 |

Example 13

Digestion of Powder in Diluents to Regain Raw Materials for Gen-1 Resin with Copolymer of Reactive Blocking Agent and Reactive Diluent and Chain Transfer Agent Into a 20 mL vial, CD421A, TBAEMA, and MEHQ were added. This mixture was vortex mixed for at least 60 s, which resulted in a clear homogenous solution. To this solution, Gen-1 powder from Example 10 produced from the resin of Example 8 was added in which two different powder loadings were chosen (see Table). After this addition step, all powders were soaked in the solution overnight. The swollen powders were heated and stirred at 120° C. for a time range of 30 min-4 hours. After this heating step, the solutions were cooled down while stirring for 30 min. The color and viscosity of the digest varied with the digestion time.

| Weight percentage (%) | Gen-1 powder mass (g) | TBAEMA (g) | CD421A (g) | MEHQ (mg) |
|---|---|---|---|---|
| 23 | 3.00 | 1.43 | 8.80 | 5 |
| 27 | 3.00 | 1.10 | 7.02 | 4 |

Example 14

Addition of Fresh Components to Create New Resin (Gen-2)

After several clear and homogenous solutions of the Gen-1 powder in both diluents (IBOMA and TBAEMA) were obtained as noted in Example 11, next-generation resins were formulated by the addition of TPO, BLS-1326, and ABPU-10. The photo-initiator and UV-absorber were dissolved by sonicating the solutions for 60 min. Next, the ABPU-10 amounts were poured into small THINKY™ mixer cups, to which the Gen-1 powder solutions were added. These mixtures were stirred by using a spatula, after which the new resins were mixed inside a THINKY™ mixer at 2000 rpm until all ABPU was mixed and the resins were clear.

| Weight percentage of Gen-1 in diluents (%) | Gen-1 powder mass in Gen-2 resin (%) | ABPU-10 (g) | TPO (mg) | BLS-1326 (mg) |
|---|---|---|---|---|
| 17 | 13 | 1.69 | 113 | 11 |
| 19 | 15 | 1.38 | 99 | 9 |
| 22 | 18 | 1.06 | 84 | 8 |

Example 15

Addition of Fresh Components to Create New Resin for Gen-1 Resin with Copolymer of Reactive Blocking Agent and Reactive Diluent (Gen-2)

After several clear and homogenous solutions of the Gen-1 powder in both diluents (CD421A and TBAEMA) were obtained as noted in Example 12, next-generation resins were formulated by the addition of TPO, BLS-1326, the copolymer mixture, and ABPU-14. The digest was poured into a THINKY™ mixer cup. The photo-initiator and UV-absorber were dissolved by THINKY™ mixing for 5 min. Next, ABPU-14 and the copolymer mixture were added to the digest and this was THINKY™ mixed for 10 min.

| Weight percentage of Gen-1 in diluents (%) | Gen-1 powder mass in Gen-2 resin (%) | ABPU-14 (g) | Copolymer* (g) | TPO (mg) | BLS-1326 (mg) |
|---|---|---|---|---|---|
| 24 | 15 | 4.51 | 2.92 | 200 | 28 |
| 28 | 20 | 3.18 | 1.19 | 150 | 21 |

*Copolymer mixture contains roughly 50 wt % diluent (CD421A)

Example 16

Addition of Fresh Components to Create New Resin for Gen-1 Resin with Copolymer of Reactive Blocking Agent and Reactive Diluent and Chain Transfer Agent (Gen-2)

After several clear and homogenous solutions of the Gen-1 powder in both diluents (CD421A and TBAEMA)

were obtained as noted in Example 13, next-generation resins were formulated by the addition of TPO, BLS-1326, BuMP, the copolymer mixture, and ABPU-14. The digest was poured into a THINKY™ mixer cup. The photo-initiator and UV-absorber were dissolved by THINKY™ mixing for 5 min. Next, ABPU-14 and the copolymer mixture were added to the digest and this was THINKY™ mixed for 10 min. Lastly, BuMP was added and THINKY™ mixed for another 5 min.

| Weight percentage of Gen-1 in diluents (%) | Gen-1 powder mass in Gen-2 resin (%) | ABPU-14 (g) | Copolymer* (g) | TPO (mg) | BLS-1326 (mg) | BuMP (mg) |
|---|---|---|---|---|---|---|
| 23 | 15 | 5.08 | 1.68 | 200 | 28 | 200 |
| 27 | 20 | 3.58 | 0.3 | 150 | 21 | 150 |

*Copolymer mixture contains roughly 50 wt % diluent (CD421A)

Example 17

Printing of Regained Resin

The newly-obtained Gen-2 resins as well as the Gen-1 resins from the foregoing examples were poured in an ASTM Type V dog bone mold, after which the resins were exposed to UV-light for 1 min on both sides. Fully-cured dog bones were obtained, indicating the usefulness of recycling Gen-1 to Gen-2 printed parts.

Example 18

Re-Addition of Diluents to Regained Raw Materials

After next-generation parts have been obtained, the cycle is continued by pulverizing parts using the freezer mill once more and adding new diluents and prepolymers to the powder. New formulations are obtained by appropriate balancing of components.

Example 19

Figure 2A:
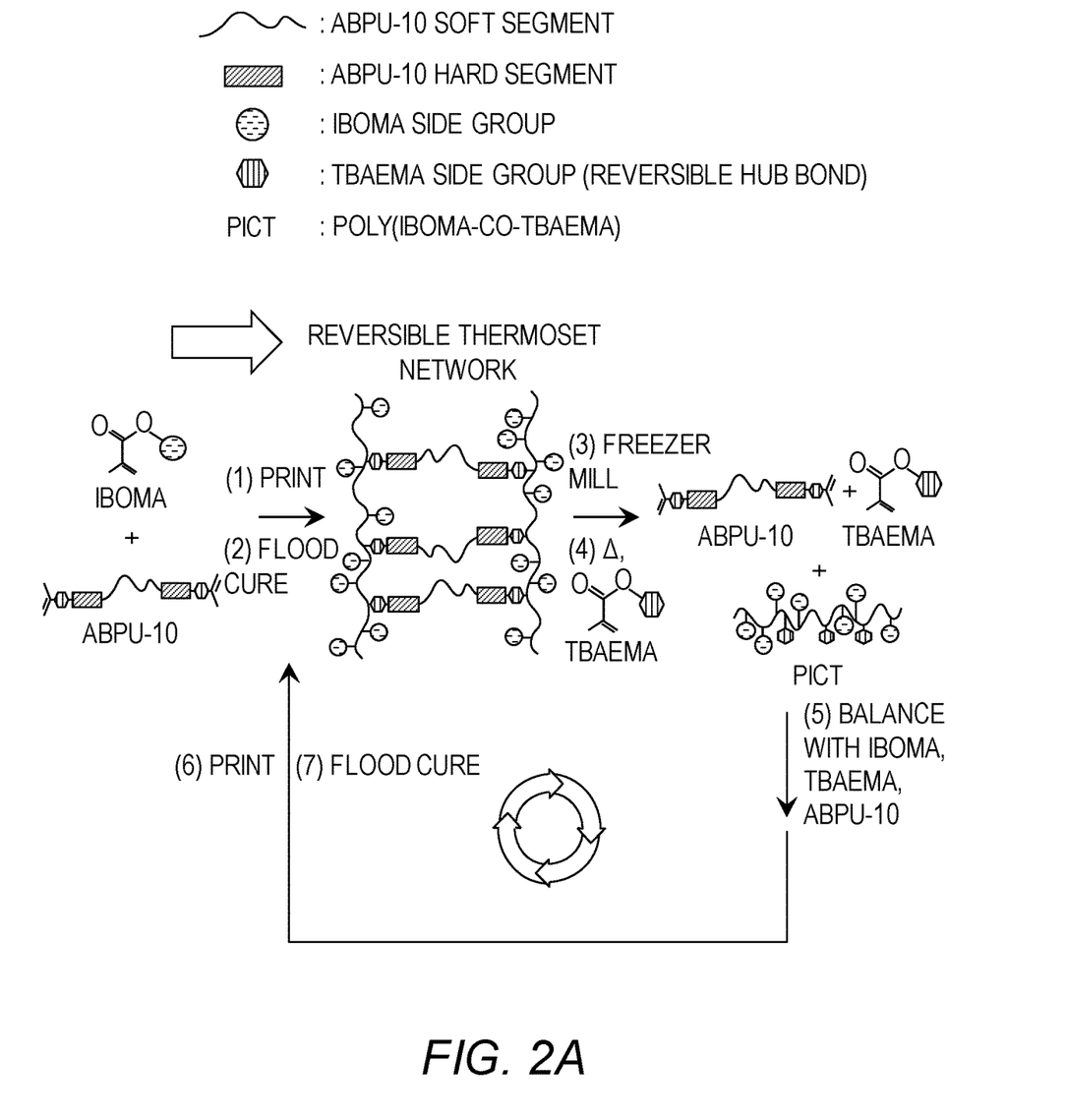
FIG. 2A and FIG. 2B provide example methods of forming and recycling a reversible thermoset network as taught herein, with an ABPU-10 as reactive blocked prepolymer, and PICT (poly-IBOMA-co-TBAEMA) as a copolymer of reactive blocking agents (TBAEMA) and reactive diluent (IBOMA).
Figure 2B:
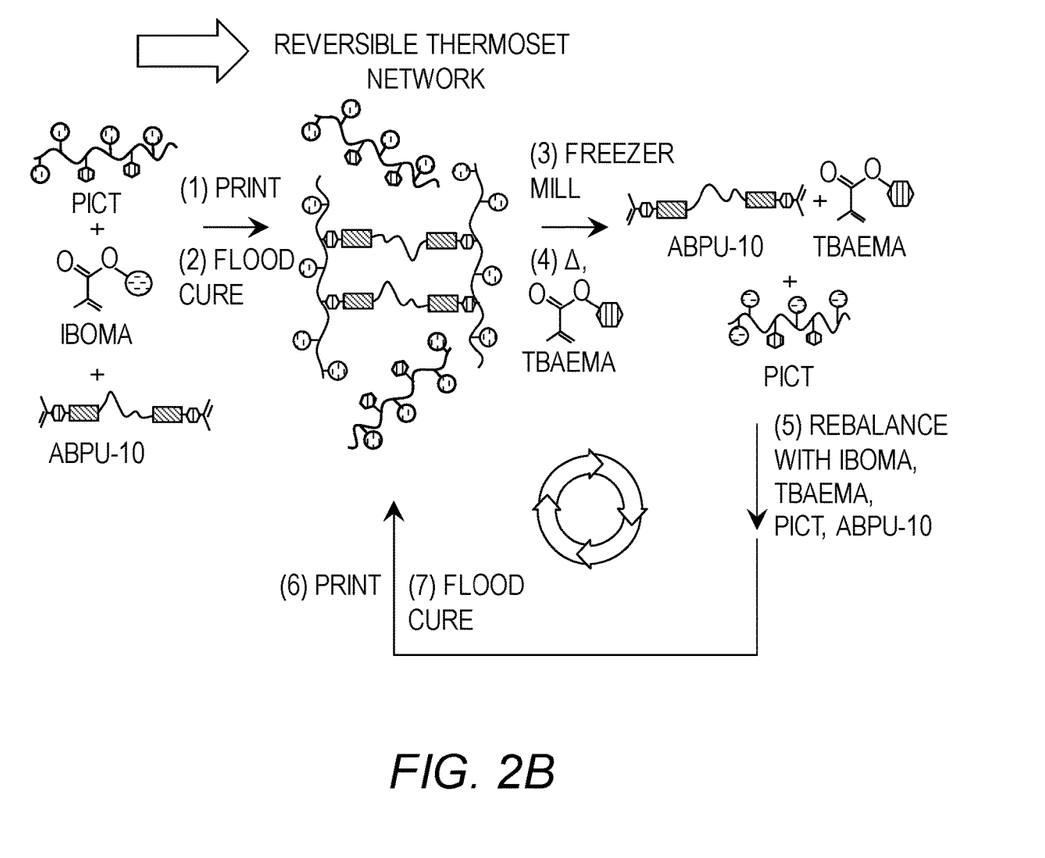

Formulations with Copolymer of Reactive Blocking Agent and Reactive Diluent FIG. 2A and FIG. 2B provide schematics of example methods of forming and recycling a reversible thermoset network as taught herein, with an ABPU-10 as reactive blocked prepolymer, and PICT as a copolymer of reactive blocking agents (TBAEMA) and reactive diluent (IBOMA). In the example method shown in FIG. 2B, PICT is included in the initial polymerization of the resin, and added to rebalance resin components after communiting the formed article and heating to form a homogeneous solution or suspension, to form a regenerated resin.

The foregoing is illustrative of the present invention, and is not to be construed as limiting thereof. The invention is defined by the following claims, with equivalents of the claims to be included therein.

We claim:

1. A method of recycling additively manufactured articles or recovered coating material, comprising:
    (a) providing a preformed article, or recovered coating material, wherein said article or coating material is produced by the process of light polymerizing a single-cure resin in an additive manufacturing or coating process, said resin comprising:
        (i) a light reactive blocked prepolymer;
        (ii) optionally polymerized light reactive blocking agents;
        (iii) optionally a light reactive blocking agent;
        (iv) a photoinitiator;
        (v) optionally a UV-curable diluent;
        (vi) optionally a light absorber;
        (vii) optionally a solvent;
        (viii) optionally a radical polymerization inhibitor;
        (ix) optionally pigments and/or dyes; and
        (x) optionally at least one filler;
        said preformed article or recovered coating material comprised of at least 70 percent by weight of a crosslinked polymer, said crosslinked polymer consisting essentially of said light reactive blocked prepolymer, said UV-curable diluent when included, and said polymerized light reactive blocking agents when included, in light polymerized, cross-linked, thermoset form; then
    (b) comminuting said preformed article or recovered coating material into a reactive particulate material; and
    (c) combining said reactive particulate material with additional unpolymerized light reactive, and optionally non-reactive, blocking agent, optionally additional unpolymerized UV-curable diluent or solvent, and optionally additional radical polymerization inhibitor, to form a mixture, and heating said mixture for a time sufficient to form a homogeneous solution or suspension comprising a regenerated light reactive, and non-reactive, when present, blocked prepolymer; optionally said additional light reactive and/or non-reactive blocking agent; optionally said additional solvent; optionally said additional radical polymerization inhibitor; and polymerized light reactive blocking agent, or a copolymer of light reactive blocking agent and UV-curable diluent.

2. The method of claim 1, further comprising:
    (d) mixing said homogeneous solution or suspension with additional photoinitiator, optionally additional light absorber, optionally additional light reactive blocked prepolymer, optionally additional UV-curable diluent, optionally additional light reactive and/or non-reactive blocking agent, and optionally additional polymerized light reactive blocking agents, or copolymer of light reactive blocking agent and UV-curable diluent, to produce a regenerated resin useful for additive manufacturing, wherein said regenerated resin is light-polymerizable.

3. The method of claim 1, wherein said polymerized light reactive blocking agent comprises a polymer formed from the polymerization of vinyl group-containing monomers.

4. The method of claim 1, wherein said light reactive blocking agent and/or additional light reactive blocking agent comprises an amine (meth)acrylate monomer blocking agent.

5. The method of claim 1, wherein said light reactive blocked prepolymer and/or regenerated light reactive blocked prepolymer comprises a light reactive blocked polyurethane prepolymer, a light reactive blocked polyurea prepolymer, a light reactive blocked polyurethane-polyurea copolymer, or a combination thereof.

6. The method of claim 1, wherein said light reactive blocked prepolymer and/or regenerated light reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

7. The method of claim 1, wherein said light reactive blocked prepolymer and/or regenerated light reactive blocked prepolymer comprises a (meth)acrylate-blocked prepolymer.

8. The method of claim 1, wherein said UV-curable diluent and/or additional UV-curable diluent comprises an acrylate, a methacrylate, a styrene, an acrylic acid, a vinylamide, a vinyl ether, a vinyl ester, polymers containing any one or more of the foregoing, or a combination of two or more of the foregoing.

9. The method of claim 1, wherein said UV-curable diluent and/or additional UV-curable diluent comprises a monofunctional UV-curable diluent.

10. The method of claim 1, wherein said single-cure resin further comprises a chain transfer agent.

11. The method of claim 1, wherein said providing step is carried out with dental models.

12. The method of claim 10, wherein the chain transfer agent is butyl 3-mercaptopropionate, dodecane thiol, 2,2'-(ethylenedioxy)diethanethiol, nonyl thiol, 4-methylthiophenol, isooctylmercapto propionate, or a mixture of two or more thereof.

13. The method of claim 1, wherein the comminuting is carried out by grinding, shredding, chopping, or pelletizing.

14. The method of claim 1, wherein said polymerized light reactive blocking agent comprises a poly(methacrylate), a poly(acrylate), a poly(styrene), a poly(acrylamide), or a copolymer thereof.

15. The method of claim 1, wherein the light reactive blocking agent and/or additional light reactive blocking agent comprises tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), acrylate analogs thereof, or a mixture of two or more thereof.

16. The method of claim 1, wherein the UV-curable diluent and/or additional UV-curable diluent comprises acrylonitrile, styrene, divinyl benzene, vinyl toluene, methyl acrylate, ethyl acrylate, butyl acrylate, methyl (meth)acrylate, an amine (meth)acrylate, or a mixture of two or more thereof.

17. The method of claim 1, wherein the UV-curable diluent and/or additional UV-curable diluent comprises isobornyl methacrylate or 3,3,5-trimethylcyclohexyl methacrylate.

* * * * *

UNITED STATES PATENT AND TRADEMARK OFFICE
CERTIFICATE OF CORRECTION

PATENT NO. : 11,135,744 B2
APPLICATION NO. : 17/274846
DATED : October 5, 2021
INVENTOR(S) : Poelma et al.

It is certified that error appears in the above-identified patent and that said Letters Patent is hereby corrected as shown below:

In the Specification

Column 6, Line 66: Please correct "s-caprolactam" to read -- ε-caprolactam --

Column 7, Lines 12-13: Please correct "n-hydroperfluoro" to read -- Ω-hydroperfluoro --

Column 11, Line 29: Please correct "L. Craven" to read -- I. Craven --

Column 12, Line 17: Please correct "70 Celsius" to read -- 70° Celsius --

Column 12, Line 17: Please correct "120 Celsius" to read -- 120° Celsius --

Signed and Sealed this
First Day of March, 2022

Drew Hirshfeld
*Performing the Functions and Duties of the
Under Secretary of Commerce for Intellectual Property and
Director of the United States Patent and Trademark Office*